United States Patent [19]
Ogino

[11] 3,929,392
[45] Dec. 30, 1975

[54] RESILIENT BEARING STRUCTURE
[75] Inventor: Michihiro Ogino, Tokyo, Japan
[73] Assignee: Nissan Motor Company Limited, Yokohama, Japan
[22] Filed: Feb. 11, 1974
[21] Appl. No.: 440,973

[30] Foreign Application Priority Data
Feb. 15, 1973  Japan.............................. 48-17853

[52] U.S. Cl. ................................. 308/26
[51] Int. Cl.² ........................................ F16C 27/00
[58] Field of Search ............ 308/26, 137, 145, 147

[56] References Cited
UNITED STATES PATENTS
| 3,319,484 | 5/1967 | Prest | 308/26 |
| 3,348,887 | 10/1967 | Sheps | 308/26 |
| 3,353,879 | 11/1967 | Jörn | 308/26 |
| 3,434,762 | 3/1969 | Marley | 308/26 |

Primary Examiner—James B. Marbert
Assistant Examiner—Robert Saifer
Attorney, Agent, or Firm—Frank J. Jordan

[57] ABSTRACT

A resilient bearing bushing or insert intended for use between a rotatingly or slidingly operating cylindrical shaft and a housing for the shaft, the bearing having a body structure particularly constructed to hold the shaft resiliently in the housing by way of point, linear or partial surface contact therewith. The bearing comprising alternately in the circumferential direction a smaller radius point circumscribing the shaft and radially inwardly spaced from the inner cylindrical wall of the housing and a larger radius point inscribing the inner cylindrical wall of the housing and radially outwardly spaced from the circumference of the shaft, said larger radius point forming axially extending longitudinal outer projections along the entire length of the bearing body.

2 Claims, 10 Drawing Figures

RESILIENT BEARING STRUCTURE

This invention relates to a resilient bearing bushing or insert intended for use between a rotatingly or slidingly operating cylindrical shaft and a housing receiving the shaft, the bearing having a body structure particularly constructed to hold the shaft resiliently in the housing by way of point, linear or partial surface contact therewith.

When supporting a cylindrical rotating or sliding shaft in a housing or casing, it has been the conventional practice to insert a bearing bushing of a regular cylindrical shape between the circumference of the shaft and the inner periphery of the housing. For practical reasons, the cylindrical bearing bushing is usually formed in a diameter slightly larger than the shaft, providing an annular gap space or clearance between the bushing and the moving shaft. Obviously, in order to attain a tightest permissible fit between these engaging parts, a high degree of accuracy is required during the manufacturing process. Particularly, when the cylindrical bushing is moved axially relative to the shaft, the latter has to be finished over a larger area with utmost precision. A failure in accuracy, particularly in outer diameter and rectilinearity of the shaft in the finished area invariably results in interference between the shaft and the bearing, obstructing smooth movement of the shaft. In order to maintain particular specifications intended for the gap space between the operating shaft and the bearing, sophisticated machining, high skills and increased attention to inspection and handling are required in the production line, which obviously lead to higher production costs.

On the other hand, a too wide gap space or clearance is also disadvantageous in that the so-called "knocking" occurs to the shaft, in other words, the shaft knocks on the bearing bushing when a load is imposed thereon in a direction perpendicular to its axis, producing great noises and accelerating wear of the bearing bushing.

It is therefore the primary object of the present invention to provide a resilient bearing bushing or insert which will eliminate the difficulties mentioned above.

It is another object of the present invention to provide a bearing bushing which is capable of resiliently holding a rotating or sliding shaft within a housing by way of point, linear or partial surface contact therewith.

It is still another object of the present invention to provide a resilient bearing bushing of the nature as mentioned above, which can be produced without strict dimensional control.

It is a further object of the invention to provide a resilient bearing bushing which is simple in construction and low in production cost.

According to the invention, a resilient bearing bushing which can attain the above-mentioned objects comprises a generally tabular body having alternately in the circumferential direction a smaller radius point to be pressed against the shaft and radially inwardly spaced from the inner periphery of the housing and a larger radius point to be pressed against the inner periphery of the housing and radially outwardly spaced from the shaft, the larger radius point forming an axially extending longitudinal outer projection along the entire length of the tubular bearing body.

In one specific form of the invention, in order to provide on the bearing alternately a smaller radius point for resilient engagement with the operating shaft and a larger radius point for engagement with the inner periphery of the housing, the bearing body is formed in a polygonal shape such as triangle, hexagon, octagon or the like. In case the bearing body is formed in a polygonal shape, the bearing body is resiliently pressed against the operating shaft at the middle points of the sides connecting the respective vertices and against the inner periphery of the housing at the respective vertices which form axially extending longitudinal outer projections along the length of the tubular bearing body. The respective sides of the polygonal bearing body may be formed straight or arcuately or otherwise if desired.

To impart sufficient resiliency or flexibility to the bearing body, it is preferred to provide a longitudinal slit along one of the outer projections or vertices of the bearing body or to provide a recess on the inner wall surface of the bearing body in positions corresponding to the respective vertices. Alternatively, the wall thickness of the bearing body may be reduced toward the respective vertices to ensure similar resiliency or flexibility.

The above and other objects, features and advantages of the invention will become apparent from the following description and appended claims, taken in conjunction with the accompanying drawings which shows by way of example preferred embodiments of the invention and in which:

FIG. 6 is a transverse cross-section taken along line V—V of FIG. 5a;

Figure 6:
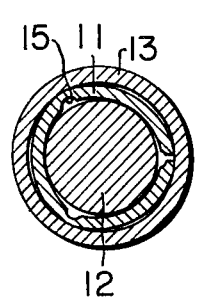

In order to remove these difficulties, without requiring inadvantageously high dimensional precision of the rotating or sliding shaft or rod 12 and the bearing body 11, the present invention proposes to provide a smaller radius point and a larger radius point alternately on the bearing body for resiliently pressing the same alternately against the shaft 12 and the inner periphery of the housing 13. This can suitably be realized by forming the bearing body 11 in a polygonal shape, for example, in a rounded triangular shape as particularly shown in FIGS. 3 to 6, preferably with a longitudinal slit 14 along one of the vertices of the triangular bearing body 11. With this bearing body construction, the bearing 11 is resiliently held against the operating shaft 12 at the middle points of the respective sides while the vertices forming axially extending longitudinal outer projections are pressed against the inner periphery of the housing 13 as seen in FIG. 6. The shaft 12 is thus suitably resiliently supported in the housing 13 by the limited flexing action of the bearing body 11 which is abutted alternately with the operating shaft 12 and the inner periphery of the housing 13.

Figure 1:
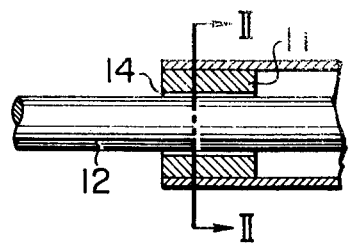
FIG. 1 is a diagrammatic sectional view showing a conventional bearing bushing or insert of the regular cylindrical shape as fit on an operating shaft.
Figure 2:
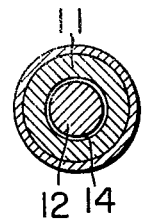
FIG. 2 is a transverse cross-section taken line II—II of FIG. 1.
Figure 3:
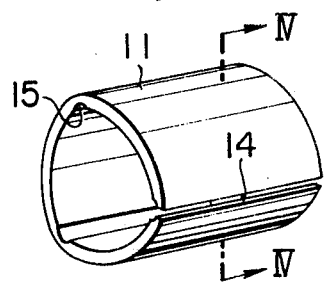
FIG. 3 is a perspective view showing a bearing bushing fabricated according to the present invention.
Figure 4:
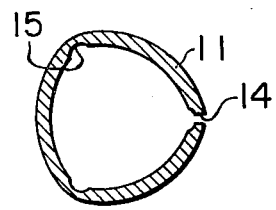
FIG. 4 is a cross-sectional view taken along line IV—IV of FIG. 3.
Figure 5:
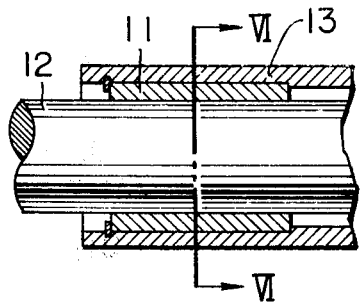
FIG. 5a is a partially sectioned fragmentary view showing the bearing bushing of FIG. 3 as inserted between a cylindrical operating shaft and a housing for the shaft.

On the contrary, it is difficult to support the shaft 11 with suitable resiliency and stability within the housing 13 when the bearing 12 is formed in a regular cylindrical shape as shown in FIGS. 1 and 2. This is because the bearing of the regular cylindrical shape can pressingly hold the shaft 2 but has no outer projections or vertices to be pressed against the inner periphery of the housing 3.

The material for forming the bearing body 11 of the invention should be selected depending upon the particular conditions under which the bearing is used. In case the bearing body 1 is employed as a steering rack bush, an acetal resin is preferred. If desired, suitable metallic material may be used for this purpose.

The provision of the longitudinal slit 14 ensures contraction and expansion of the bearing body 1 within a limited space between the shaft 12 and the housing 13. Similar bearing contracting and expanding effects can be obtained by forming the bearing body 11 in a double flute at the respective vertices as will be described in greater detail hereinafter.

In the particular embodiment shown in FIGS. 3 to 6, the bearing body 11 is formed with longitudinal recesses 15 on the inner surface thereof along the respective vertices for facilitating the flexing action of the bearing. With these recesses, when the operating shaft 12 is pressed with its load against one of the sides of the bearing body 11 and the one side is subjected to resulting deformation, the load applied to the one side and the resulting deformation are not transmitted to the other sides of the bearing body because the recesses can absorb the load and the deformation applied and prevent the transmission thereof. However, the flexibility of the bearing body 11 may also be ensured by reducing the wall thickness of the bearing body toward the respective vertice, instead of providing recesses as shown at 15.

Figure 7:
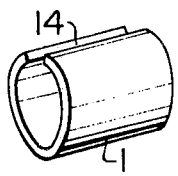
FIG. 7 is a perspective view diagrammatically showing a modified structure of the bearing bushing according to the present invention.

FIG. 7 shows a modified structure of the bearing according to the present invention, wherein the tubular bearing body 11 is formed in an oval shape in cross section with a longitudinal slit at one end.

Figure 8:
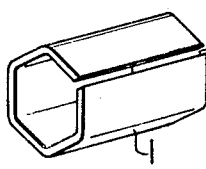
FIG. 8 is a perspective view diagrammatically showing another modification of the bearing bushing according to the present invention.

Alternatively, the bearing body 11 may be formed in other polygonal shapes, for example, in a hexagonal shape as shown in FIG. 8 with a slit 14 extending longitudinally along one vertex. With this construction, the bearing body 11 is similarly resiliently pressed against the circumference of the shaft 12 in the middle portion of each side of the hexagon while the outward projections formed by the respective vertices are held against the inner periphery of the housing 13, thus holding the shaft 12 resiliently in the housing 13.

Figure 9:
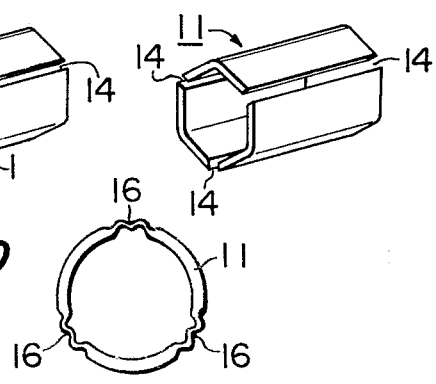
FIG. 9 is a perspective view showing diagrammatically still another modification of the bearing bushing according to the present invention.

In the foregoing embodiment, the bearing 11 is formed with only one longitudinal slit 14. However, a similar slit may be provided at each vertex or longitudinal outward projection of the bearing body as shown in FIG. 9, if desired, dividing the bearing body into three longitudinally extending separate sections.

Figure 10:
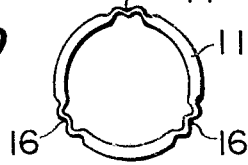
FIG. 10 is an end view showing diagrammatically a further modification of the bearing bushing according to the invention.

FIG. 10 shows a further modification of the resilient bearing bushing structure according to the invention, wherein the bearing body 11 is formed generally in a rounded triangular shape as in the embodiment of FIG. 1, but has longitudinally parallelly extending double projections or double flutes 16 at each vertex instead of a longitudinal slit 14. The longitudinal double projections or double flutes have a wall thickness smaller than the arcuate sides connecting the respective fluted vertices.

In assembly, the resilient bearing bushing 11 is first fitted into the outer housing 13 and fixed in position by suitable means and then the shaft 12 is inserted through the bearing body 11 thus fixed. Upon insertion of the shaft 12, the bearing body 11 is slightly radially expanded so that the vertices or the longitudinal projections are pressed against the inner periphery of the housing 13, the bearing body 11 thus resiliently embracing the shaft 12 within the housing 13.

Even if worn due to abraisive contact with the rotating or sliding shaft 12 beyond a point at which replacement is usually necessitated with the existing regular cylindrical inserts, the bearing 11 of the invention can still, due to its resiliency, hold the shaft with suitable stability within the housing 13 for a longer period of time.

The foregoing is considered as illustrative only of the principles of the invention. Further, since numerous modifications and changes will readily occur to those skilled in the art, it is not desired to limit the invention the exact constructions shown and described, and accordingly, all suitable modifications and equivalents, particularly with regard to the shape of the bearing body, may be resorted to, falling within the scope of the invention as defined by the appended claims.

What is claimed is:

1. A resilient bearing bushing for use between a rotatingly or slidingly operating cylindrical shaft and a cylindrical housing for said shaft, said resilient bearing bushing comprising a generally tubular body having three arcuate side walls and three arcuate vertices, said side walls each having inner surfaces which are arcuate along their entire circumferential extent, each of said inner arcuate surfaces having a central, circumferential portion constituting a major portion of said arcuate inner surface, said central, circumferential portion resiliently pressed against a corresponding circumferential portion of said shaft, said side walls each having outer surfaces which are arcuate along their entire circumferential extent and which are radially spaced from the inner periphery of said cylindrical housing, said vertices having outer surfaces resiliently pressed against the inner periphery of said cylindrical housing and inner surfaces spaced from the circumference of said shaft, said tubular body having three recesses formed on the inner surface of said tubular body in positions corresponding to said vertices, said recesses having a wall thickness smaller than the thickness of the remaining portions of the tubular body such that the thickness of said tubular body at said vertices is less than the thickness of said tubular body at the remaining portions thereof.

2. A resilient bearing bushing as claimed in claim 1, further including a longitudinal slit formed along one of said vertices.

* * * * *